United States Patent

[11] 3,593,113

| [72] | Inventor | David Wiley |
| | | Walsall, England |
| [21] | Appl. No. | 844,291 |
| [22] | Filed | July 24, 1969 |
| [45] | Patented | July 13, 1971 |
| [73] | Assignee | Joseph Lucas Industries Limited |
| | | Birmingham, England |
| [32] | Priority | Aug. 1, 1968 |
| [33] | | Great Britain |
| [31] | | 36718/68 |

[54] VOLTAGE REGULATORS USING PLANAR TRANSISTORS WITH RADIO INTERFERENCE SUPPRESSION
1 Claim, 1 Drawing Fig.

[52] U.S. Cl. ................................................ 322/28,
320/68, 322/58, 322/73, 328/167, 330/19, 333/12
[51] Int. Cl. ................................................ H02p 9/30,
H02k 11/00
[50] Field of Search ................................................ 323/4, 9,
16—22, 15; 322/28, 58, 73; 328/167; 325/313,
473; 330/19, 110; 333/12, 70 R, 79; 320/59, 60,
68; 317/50

[56] References Cited
UNITED STATES PATENTS

| 2,884,520 | 4/1959 | Lambert ...................... | 333/12 |
| 3,247,443 | 4/1966 | Brayley et al. ................ | 320/68 |
| 3,487,324 | 12/1969 | Jones............................ | 330/19 X |
| 3,496,443 | 2/1970 | Snedeker et al. ............. | 320/68 X |

*Primary Examiner*—Gerald Goldberg
*Attorney*—Holman & Stern

ABSTRACT: A voltage regulator for a battery charging system has a first transistor which when conductive permits current to flow in a field winding of a generator used to charge the battery. A second transistor has its collector-emitter path connected in a circuit across the base emitter path of the first transistor so that conduction of the second transistor removes base current from the first transistor. The second transistor is controlled by voltage sensitive means in its base circuit and the collector of the second transistor is connected to the base of the first transistor through a pair of resistors in series, the junction of the resistors being connected through a capacitor to the collector of the first transistor to minimize radio interference.

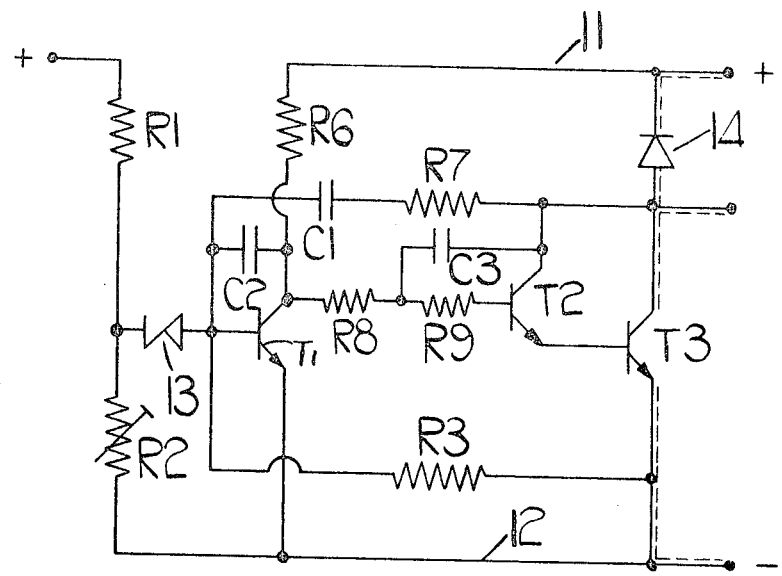

VOLTAGE REGULATORS USING PLANAR TRANSISTORS WITH RADIO INTERFERENCE SUPPRESSION

This invention relates to voltage regulators for use in battery charging systems on road vehicles.

A voltage regulator according to the invention includes a first transistor which when conductive permits current to flow in a field winding of a generator, used to charge the battery of a road vehicle, and a second transistor having its collector-emitter path connected in a circuit across the base-emitter path of the first transistor so that when the second transistor conducts base current is removed from the first transistor, and voltage sensitive means controlling conduction of the second transistor to regulate the output voltage of the generator, the collector of the second transistor being connected to the base of the first transistor through a pair of resistors in series, and the junction of said resistors being connected through a capacitor to the collector of the first transistor, the pair of resistors and capacitor serving to minimize radio interference.

The accompanying drawing is a circuit diagram illustrating one example of the invention.

Referring to the drawing, an alternator (not shown) is used to charge the battery of a road vehicle and to supply power to positive and negative supply lines 11, 12, the negative terminal of the battery also being connected to the line 12, which conveniently is earthed. Connected directly across the battery so as to conduct at all times are a pair of resistors R1, R2, the resistor R2 being preset so that regulation occurs at a predetermined voltage. The junction of the resistors R1, R2 is connected through a Zener diode 13 to the base of an NPN transistor T1 having its emitter connected to the line 12 and its collector connected through a resistor R6 to the line 11. The base and collector of the transistor T1 are interconnected through a capacitor C2.

The collector of the transistor is connected through a pair of resistors R8, R9 in series to the base of an NPN T2, the emitter of which is connected to the base of an NPN transistor T3 having its emitter connected to the line 12 and its collector connected to the line 11 through the field winding of an alternator, the field winding being bridged by a diode 14. The collectors of the transistors T2 and T3 are connected to the base of the transistor T1 through a resistor R7 and capacitor C1 in series, and the collector of the transistor T2 is connected to the junction of the resistors R8, R9 through a capacitor C3. The transistor T3 has its emitter connected to the base of the transistor T1 through a resistor R3.

In use, when the ignition switch of the vehicle is first closed power is supplied to the line 11 from the battery, and current flows through resistors R6, R8 and R9 turns on the transistors T2 and T3 so that field current flows. At the same time, a warning lamp is illuminated. When the generator produces an output, power is still supplied to the line 11, but is now supplied by the generator so that the warning lamp is extinguished. However, current continues to flow in the field winding until the battery voltage reaches a value at which the Zener diode 13 breaks down, whereupon the transistor T1 is rendered conductive and removes base current flowing through the resistor R8 and R9, so that the transistors T2 and T3 turn off and the field current is reduced to zero. By virtue of the feedback path through resistor R7 and capacitor C1, the circuit oscillates rapidly between one state in which transistor T1 is on and transistors T2 and T3 are off, and another state in which transistor T1 is off and transistors T2 and T3 are one. The mean current flow in the field winding depends on the mark-space ratio of the circuit, which in turn is determined by the current flow through the Zener diode 13, which in turn is determined by the battery voltage, the arrangement being such that the voltage of the battery is maintained substantially constant.

Temperature compensation is provided by choosing the value of the resistor R1 in relation to the value of the resistor R3 and the base-emitter characteristic of the transistor T1, so that variations in temperature are automatically catered for.

The purpose of the capacitor C2 is to minimize radio interference. However, the circuit shown is particularly designed for use with planar transistors, and when such transistors are employed it is difficult to use a capacitor C2 of sufficiently high value to prevent radio interference altogether. It is further found that merely to connect another capacitor between the collector and base of the transistor T2 is not sufficient, and in order to overcome the problem the network consisting of resistors R8, R9 and the capacitor C3 is employed.

In a modification, the transistor T2 has its emitter connected to the line 12.

Having thus described my invention what I claim as new and desire to secure by Letters Patent is:

1. A voltage regulator for use in a battery charging system on a road vehicle, including a first planar transistor which when conductive permits current to flow in a field winding of a generator, used to charge the battery of a road vehicle, and a second planar transistor having its collector-emitter path connected in a circuit across the base-emitter path of the first transistor so that when the second transistor conducts base current is removed from the first transistor, and voltage sensitive means controlling conduction of the second transistor to regulate the output voltage of the generator, the collector of the second transistor being connected to the base of the first transistor through a pair of resistors in series, and the junction of said resistors being connected through a capacitor to the collector of the first transistor, the pair of resistors and capacitor serving to minimize radio interference.